US012803149B2

(12) United States Patent
Dinc et al.

(10) Patent No.: US 12,803,149 B2
(45) Date of Patent: Nov. 17, 2026

(54) ON-CHIP DIRECTIONAL COUPLER

(71) Applicant: Texas Instruments Incorporated, Dallas, TX (US)

(72) Inventors: Tolga Dinc, Dallas, TX (US); Swaminathan Sankaran, Allen, TX (US); Sachin Kalia, Dallas, TX (US)

(73) Assignee: TEXAS INSTRUMENTS INCORPORATED, Dallas, TX (US)

(*) Notice: Subject to any disclaimer, the term of this patent is extended or adjusted under 35 U.S.C. 154(b) by 80 days.

(21) Appl. No.: 17/349,022

(22) Filed: Jun. 16, 2021

(65) Prior Publication Data

US 2022/0407210 A1 Dec. 22, 2022

(51) Int. Cl.
*H01P 5/18* (2006.01)

(52) U.S. Cl.
CPC .................................... *H01P 5/18* (2013.01)

(58) Field of Classification Search
CPC ...... H01P 5/18; H01P 5/12; H01P 5/16; H01P 5/183; H01P 5/184; H01P 5/185; H01P 5/186; H01P 5/187
See application file for complete search history.

(56) References Cited

U.S. PATENT DOCUMENTS 9,379,678 B2 * 6/2016 Kase ...................... H03F 3/195
2013/0207741 A1 * 8/2013 Presti ...................... H03H 7/48 333/111
2014/0152396 A1 6/2014 Fackelmeier et al.
2017/0317395 A1 * 11/2017 Srirattana ............... H03H 7/40
2018/0233796 A1 8/2018 Zhang et al.
2020/0212529 A1 7/2020 Matsumoto
2021/0159580 A1 5/2021 Radchenko et al.

FOREIGN PATENT DOCUMENTS

JP 2008060915 A 3/2008
JP 2008244924 A 10/2008
JP 2013021437 A 1/2013

OTHER PUBLICATIONS

International Search Report in corresponding PCT Application No. PCT/US2022/033194, mailed Sep. 27, 2022 (3 pages).
Machine Translation for JP2013021437.
European Search Report, Application No. 22825587.3, dated Sep. 5, 2024.
Machine Translation for JP2008244924A.
Machine Translation for JP2008060915A.

* cited by examiner

*Primary Examiner* — Stephen E. Jones
(74) *Attorney, Agent, or Firm* — Xianghui Huang; Charles F. Koch

(57) ABSTRACT

An on-chip directional coupler includes a first linear conductive trace, a second linear conductive trace, and a conductive loop. The first linear conductive trace including an end and a coupled port. The second linear conductive trace is spaced apart from and parallel to the first linear conductive trace. The second linear conductive trace includes an end and an isolated port. The conductive loop includes a first end conductively coupled to the end of the first linear conductive trace, and a second end conductively coupled to the end of the second linear conductive trace.

24 Claims, 5 Drawing Sheets

ON-CHIP DIRECTIONAL COUPLER

BACKGROUND

Directional couplers are devices that detect signal power being transmitted in a particular direction. Directional couplers are used to detect signal in a wide variety of radio frequency circuits. A directional coupler includes four ports. The first port is an input port that receives a transmitted signal from a source. The second port is an output port that provides the transmitted signal to a destination. As signal propagates from the first port to the second port, a portion of the signal is coupled to the third port. The third port is a coupled port that outputs signal coupled from the transmitted signal. The fourth port is an isolated port. Preferably, no signal is coupled to the fourth port. Output of the third port may be applied to measure or control the power of the transmitted signal, or to determine parameters of the transmission signal path.

SUMMARY

Directional couplers that provide independent control of magnetic and capacitive coupling are described herein. In one example, an on-chip directional coupler includes a first linear conductive trace, a second linear conductive trace, a first curved conductive trace, and a second curved conductive trace. The first linear conductive trace is formed in a first metal layer, and includes an end and a coupled port. The second linear conductive trace is formed in the first metal layer, and is spaced apart from and parallel to the first linear conductive trace. The second linear conductive trace includes an end and an isolated port. The first curved conductive trace is formed in a second metal layer, and includes a first end and a second end. The first end is conductively coupled to the end of the of the first linear conductive trace. The second curved conductive trace is formed in the first metal layer, and includes a first end and a second end. The first end of the second curved conductive trace is conductively coupled to the second end of the first curved conductive trace. The second end of the second curved conductive trace is conductively coupled to the end of the second linear conductive trace.

In another example, an on-chip directional coupler includes a first linear conductive trace, a second linear conductive trace, and a conductive loop. The first linear conductive trace including an end and a coupled port. The second linear conductive trace is spaced apart from and parallel to the first linear conductive trace. The second linear conductive trace includes an end and an isolated port. The conductive loop includes a first end conductively coupled to the end of the first linear conductive trace, and a second end conductively coupled to the end of the second linear conductive trace.

In a further example, an integrated circuit includes a transmit power amplifier, a transmission conductor, a transmit terminal, and a directional coupler. The transmit power amplifier including an output. The transmission conductor includes a first end and a second end. The first end of the transmission conductor is conductively coupled to the output of the transmit power amplifier. The transmit terminal is conductively coupled to the second end of the transmission conductor. The directional coupler is configured to detect signal in the transmission conductor, and includes a first linear conductive trace, a second linear conductive trace, and a conductive loop. The first linear conductive trace is formed in a first metal layer and includes an end and a coupled port. The second linear conductive trace is formed in the first metal layer, and is spaced apart from and parallel to the first conductive trace. The second linear conductive trace includes an end and an isolated port. The conductive loop is formed in the first metal layer and a second metal layer, and includes a first end and a second end. The first end of the conductive loop is conductively coupled to the end of the first linear conductive trace. The second end of the conductive loop is conductively coupled to the end of the second linear conductive trace.

DETAILED DESCRIPTION

Figure 1:
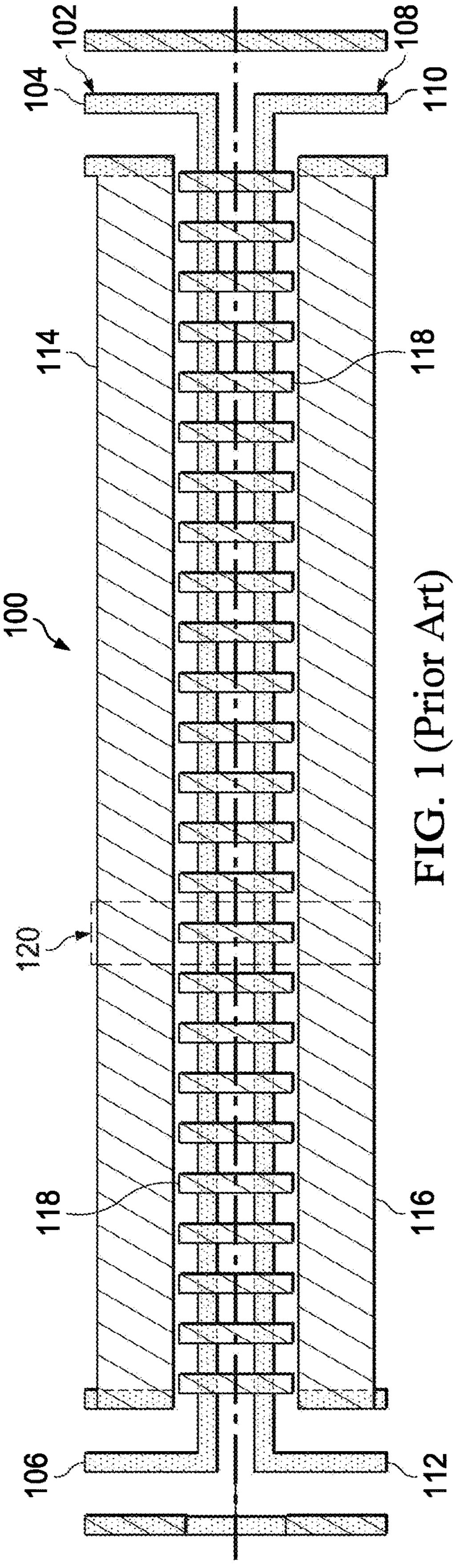
FIG. 1 (Prior Art)
FIG. 1 is a diagram of a conventional directional coupler.

Radio frequency (RF) integrated circuits, such as automotive radar integrated circuits, include built-in self-test systems the employ on-chip directional couplers to verify signal path components and connections. Conventional on-chip directional couplers suffer from interdependency of parameters that result in performance compromises, such as large circuit area or low directivity. FIG. 1 is a diagram of a conventional directional coupler 100. The conventional directional coupler 100 includes a conductive signal trace 102, a conductive coupling trace 108, ground planes 114 and 116, and loading trace segments 118. The conductive signal trace 102 and the conductive coupling trace 108 are disposed on a same metal layer of an integrated circuit. The conductive signal trace 102 includes an input port 104 and an output port 106. The conductive coupling trace 108 includes a coupled port 110 and an isolated port 112. Signal enters the conductive signal trace 102 at the input port 104, and exits the conductive signal trace 102 at the output port 106. As signal propagates through the conductive signal trace 102, a portion of the signal is coupled, magnetically and/or capacitively, to the conductive coupling trace 108. Coupled signal is provided at the coupled port 110.

The ground plane 114 and the ground plane 116 isolate the conductive signal trace 102 and the conductive coupling trace 108 from noise sources in the integrated circuit. The ground plane 114 and the ground plane 116 may be formed on the same metal layer as the conductive signal trace 102 and the conductive coupling trace 108, and/or on a metal layer other than that of the conductive signal trace 102 and the conductive coupling trace 108.

The loading trace segments 118 are provided on a metal layer of the integrated circuit other than that of the conductive signal trace 102 and the conductive coupling trace 108. The loading trace segments 118 load the conductive signal trace 102 and the conductive coupling trace 108 to help control parasitic capacitance.

Figure 2:
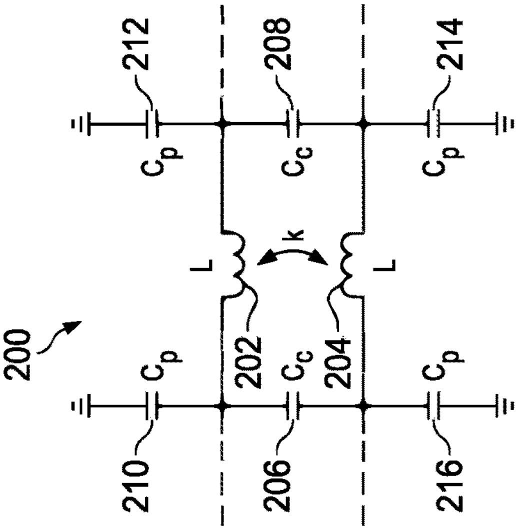
FIG. 2 (Prior Art)
FIG. 2 is schematic of an equivalent circuit for portion of the directional coupler of FIG. 1.

FIG. 2 is schematic of an equivalent circuit 200 for a segment 120 (shown in FIG. 1) of the conventional directional coupler 100. The segment 120 is modeled as inductors 202 and 204 (L is inductance and k is magnetic coupling between the inductors), coupling capacitors 206 and 208 (coupling capacitance $C_C$), and parasitic capacitors 212 (parasitic capacitance $C_p$), 214, 216, and 218. In the equivalent circuit 200, the values of k, $C_p$, and $C_C$ are interdependent. That is, changing a physical parameter of the segment 120 (e.g., width or spacing of the conductive signal trace 102 and the conductive coupling trace 108) does not change k, $C_p$, or $C_C$ in isolation, but changes more than one of k, $C_p$, or $C_C$. This interdependence limits the performance of the conventional directional coupler 100. In the equivalent circuit 200, characteristic impedance ($Z_0$) is:

$$Z_0=\sqrt{Z_e Z_o}$$

where: $Z_e$ is even mode impedance; and $Z_o$ is odd mode impedance.

Even mode impedance is:

$$Z_e = \sqrt{\frac{(1+k)L}{2C_p}} \tag{2}$$

Odd mode impedance is:

$$Z_o = \sqrt{\frac{(1-k)L}{2(C_p+C_c)}} \tag{3}$$

The ratio of even mode impedance to odd mode impedance is:

$$\frac{Z_e}{Z_o} = \sqrt{\frac{(1+k)}{(1-k)}\left(1+\frac{C_c}{C_p}\right)} \tag{4}$$

The ratio of odd mode propagation constant ($\beta_o$) to even mode propagation constant ($\beta_e$) is:

$$\frac{\beta_e}{\beta_o} = \sqrt{\frac{(1-k)}{(1+k)}\left(1+\frac{C_c}{C_p}\right)} \tag{5}$$

Figure 3:
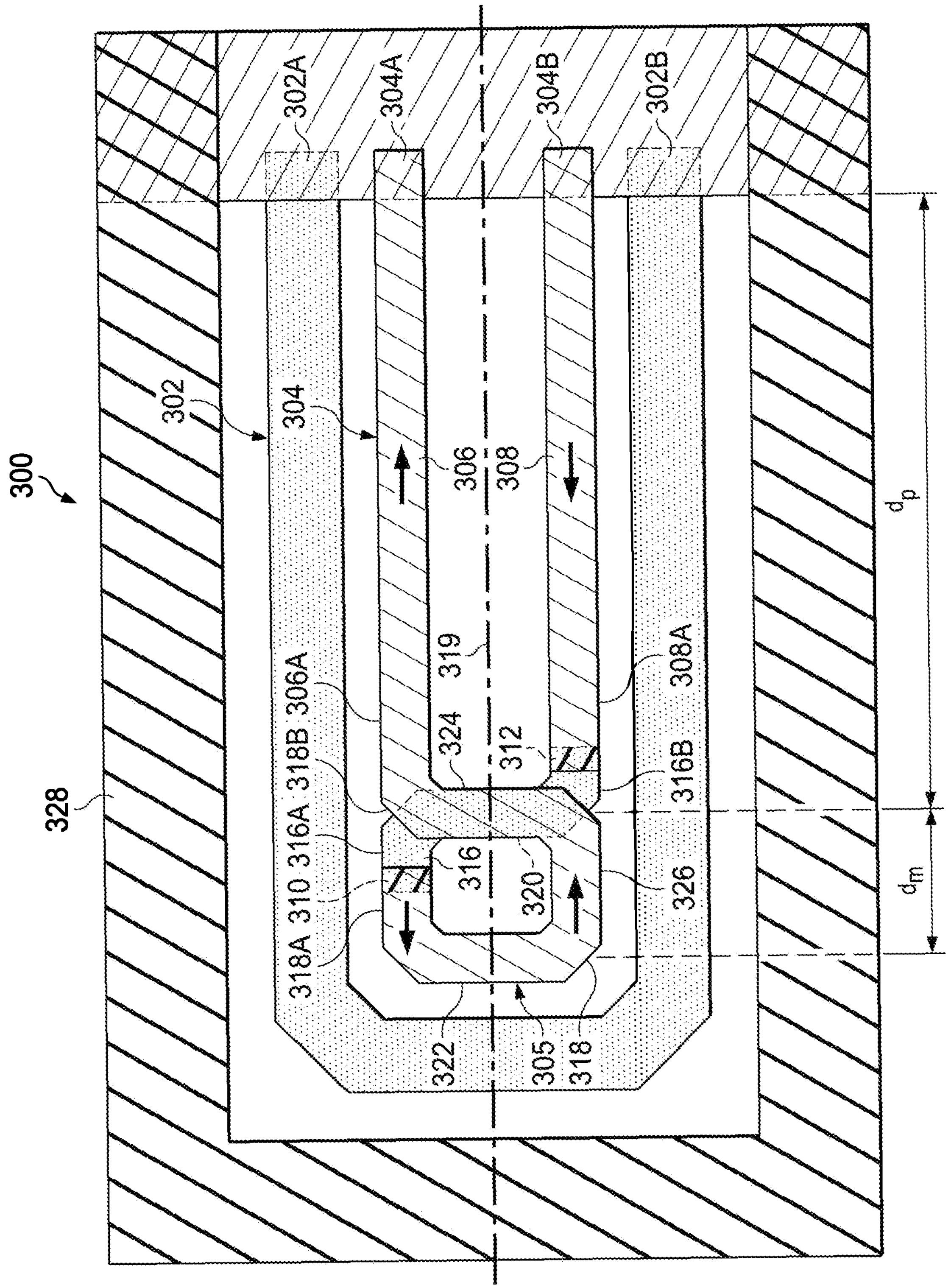
FIG. 3 is a diagram of a first directional coupler that provides independent control of magnetic and capacitive coupling.

In equations (2)-(5), because k, $C_p$, and $C_C$ are not independent, even and odd mode impedance and propagation constant cannot be set independently to achieve low coupling and high directivity. FIG. 3 is a diagram of a directional coupler 300 that provides independent control of magnetic and capacitive coupling. The directional coupler 300 may be formed on an integrated circuit, a packaging substrate, a printed circuit board, etc. With independent control of magnetic and capacitive coupling, the directional coupler 300 allows even and odd mode impedance and propagation constant to be set independently, which allow for improved directivity.

The directional coupler 300 includes a signal conductor 302 and a coupling conductor 304. The signal conductor 302 includes an input port 302A and an output port 302B. The coupling conductor 304 includes a coupled port 304A and an isolated port 304B. Signal introduced to the signal conductor 302 via the input port 302A exits the signal conductor 302 at the output port 302B. As signal traverses the signal conductor 302, a portion of the signal is magnetically and/or capacitively coupled into the coupling conductor 304, and exits the coupling conductor 304 via the coupled port 304A.

The coupling conductor 304 includes a linear conductive trace 306, a linear conductive trace 308, and a conductive loop 305. A first end of the linear conductive trace 306 is conductively coupled to the coupled port 304A, and a second end 306A of the linear conductive trace 306 is conductively coupled to the conductive loop 305. A first end of the linear conductive trace 308 is conductively coupled to the isolated port 304B, and a second end 308A of the linear conductive trace 306 is conductively coupled to the conductive loop 305. The linear conductive trace 306, the linear conductive trace 308, and the conductive loop 305 form a transformer-like structure that allows for control of magnetic coupling in the directional coupler 300 (magnetic coupling between the signal conductor 302 and the coupling conductor 304) as a function of (a ratio of) diameter ($d_m$) of the conductive loop 305 to length ($d_p$) of the linear conductive trace 306 and linear conductive trace 308. As shown in FIG. 3, the diameter of the conductive loop 305 is measured along the centerline 319. The conductive loop 305 reverses the direction of current flow, so the current flow in the conductive loop 305 is in a direction opposite the direction of current flow in the linear conductive trace 306 and the linear conductive trace 308, and the polarity of magnetic flux within the conductive loop 305 is opposite the polarity of magnetic flux between the linear conductive trace 306 and the linear conductive trace 308.

The linear conductive trace 306 and the linear conductive trace 308 are formed in a same metal layer of the integrated circuit. A first portion of the conductive loop 305 is formed in the same (a first) metal layer as the linear conductive trace 306 and the linear conductive trace 308, and second portion of the conductive loop 305 is formed in a different (a second) metal layer of the integrated circuit. The conductive loop 305 includes a first curved conductive trace 316, and a second curved conductive trace 318. The second curved conductive trace 318 is formed in the same metal layer as the linear conductive trace 306 and the linear conductive trace 308 (first metal layer). The first curved conductive trace 316 is formed in a different metal layer (second metal layer) than the second curved conductive trace 318. The first curved conductive trace 316 includes a first end 316A and a second end 316B. The second curved conductive trace 318 includes a first end 318A and a second end 318B. The first end 316A of the first curved conductive trace 316 is coupled to the first end 318A of the second curved conductive trace 318 by a via 310 that connects the metal layers of the first curved conductive trace 316 and the second curved conductive trace 318. Similarly, the second end 316B of the first curved conductive trace 316 is coupled to the second end 308A of the linear conductive trace 308 by a via 312 that connects the metal layers of the first curved conductive trace 316 and the linear conductive trace 308. The second end 318B of the second curved conductive trace 318 is coupled to the second end 306A of the linear conductive trace 306.

The first curved conductive trace 316 includes a conductive trace segment 320 that is coupled to the linear conductive trace 308, and may be perpendicular to the linear conductive trace 306 and the linear conductive trace 308. The second curved conductive trace 318 includes a conductive trace segment 322, a conductive trace segment 324, and a conductive trace segment 326. The conductive trace segment 322 may be perpendicular to the linear conductive trace 306 and the linear conductive trace 308. The conductive trace segment 326 is coupled to, and may be perpendicular to, the conductive trace segment 322. The conductive trace segment 324 is coupled to, and may be perpendicular to, the conductive trace segment 326.

The signal conductor 302 may be formed in the same metal layer as the first curved conductive trace 316, the same metal layer as the second curved conductive trace 318, or a different metal layer. The coupling capacitance between the signal conductor 302 and the coupling conductor 304 may be reduced by placing the signal conductor 302 on a different metal layer from the linear conductive trace 306 and the linear conductive trace 308. A ground plane 328 isolates the signal conductor 302 and the coupling conductor 304 from other circuitry of the integrated circuit.

Figure 4:
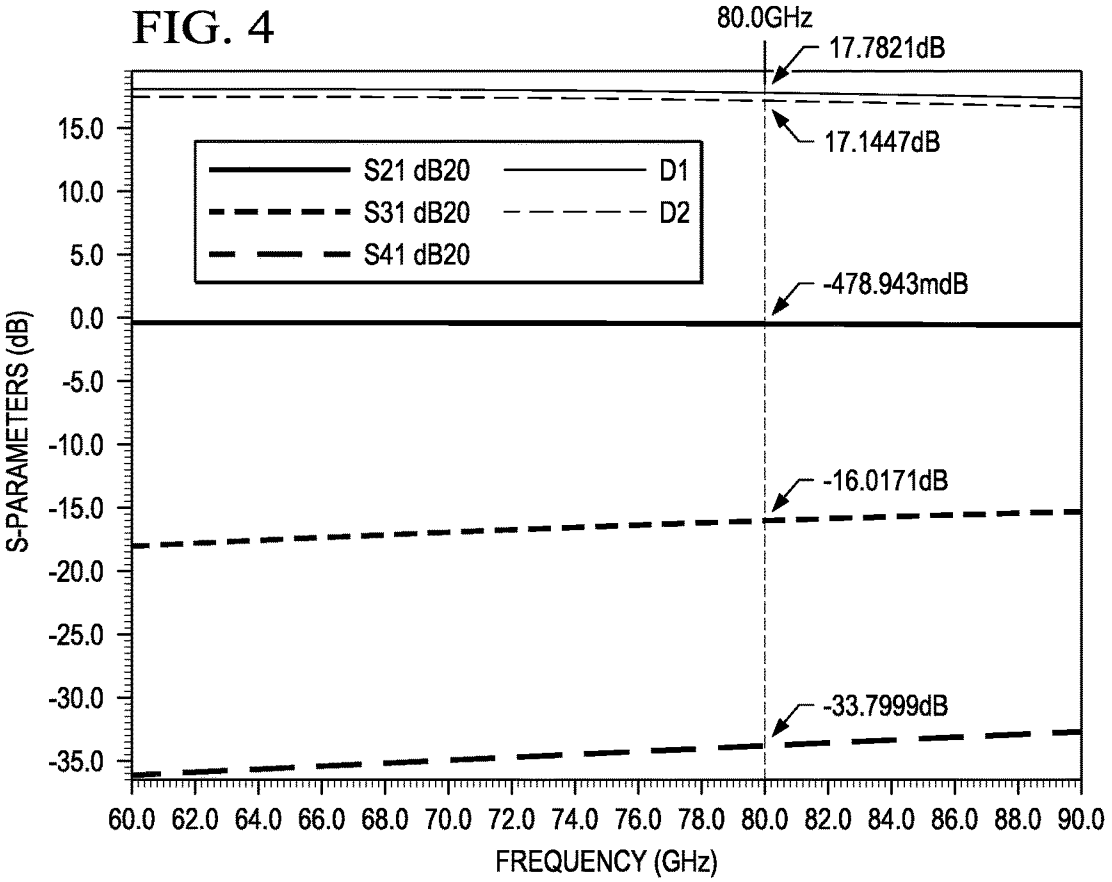
FIG. 4 is a graph showing performance of the directional coupler of FIG. 3.

By providing independent control of magnetic coupling, the directional coupler 300 provides improved directivity (e.g., 3 decibels (dB) improvement) in a significantly smaller (e.g., 60% smaller) area than conventional directional couplers. FIG. 4 is a graph showing s-parameters of an implementation of the directional coupler 300. FIG. 4 shows that an implementation of the directional coupler 300 provides: −16 dB of coupling (S31), isolation of about 34 dB (S41), 17-18 dB of directivity (D1, D2) with an 80 gigahertz (GHz) input signal, and less than 0.48 dB (S21) of loss from the input port to the output port.

Figure 5:
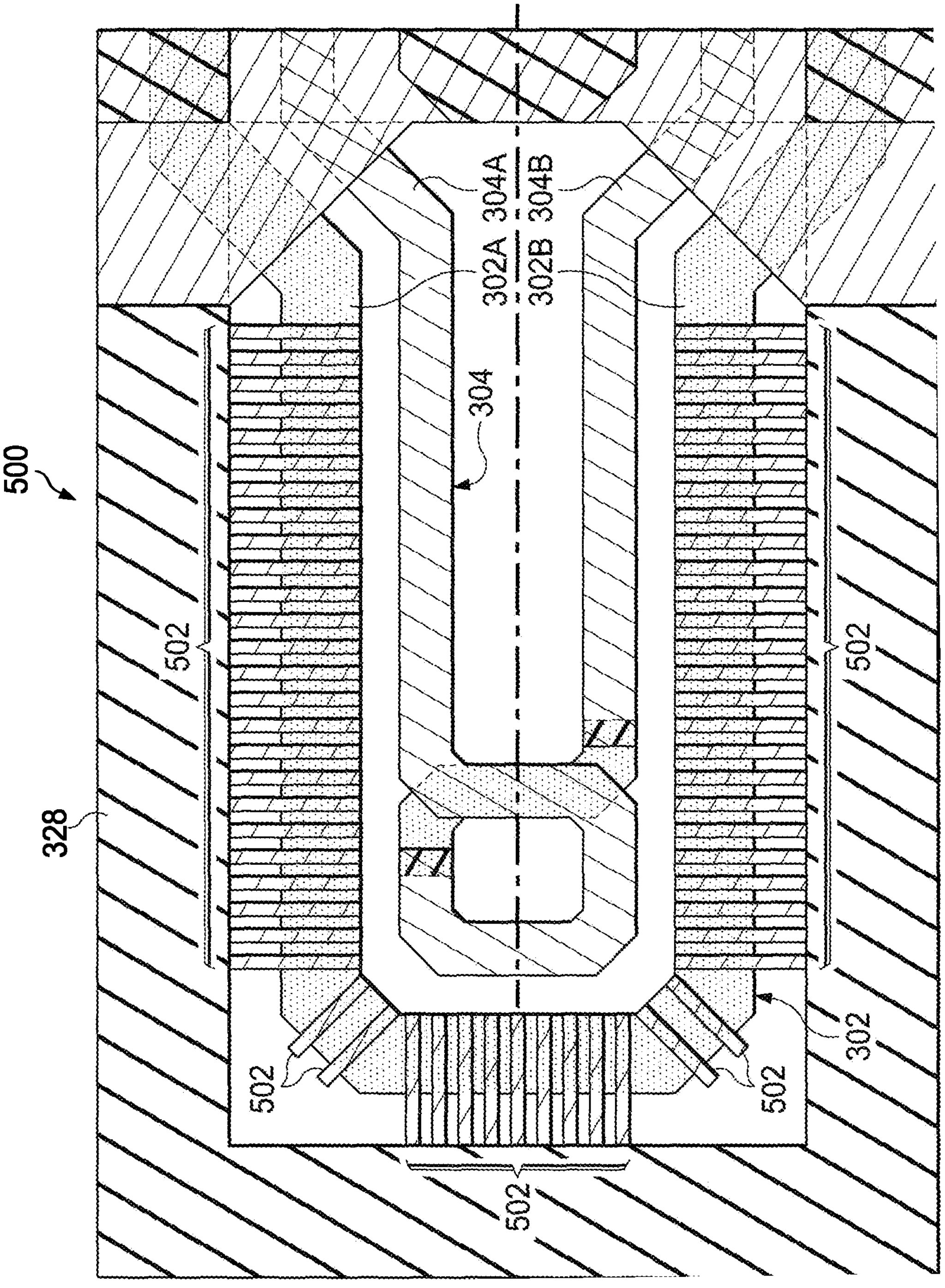
FIG. 5 is a diagram of a second directional coupler that provides independent control of magnetic and capacitive coupling.

FIG. 5 is a diagram of another directional coupler 500 that provides independent control of magnetic and capacitive coupling. The directional coupler 500 is an implementation of the directional coupler 300, and includes additional linear conductive trace segments 502 disposed orthogonal to the signal conductor 302. The linear conductive trace segments 502 may be coupled to the ground plane 328. The linear conductive trace segments 502 periodically load the signal conductor 302 to increase parasitic capacitance ($C_p$) and improve isolation and directivity. FIG. 5 shows that the ports 302A, 302B, 304A, and 304B of the directional coupler 500 may be routed in different directions as needed to facilitate connection of the directional coupler 500 to other circuitry of the integrated circuit.

Figure 6:
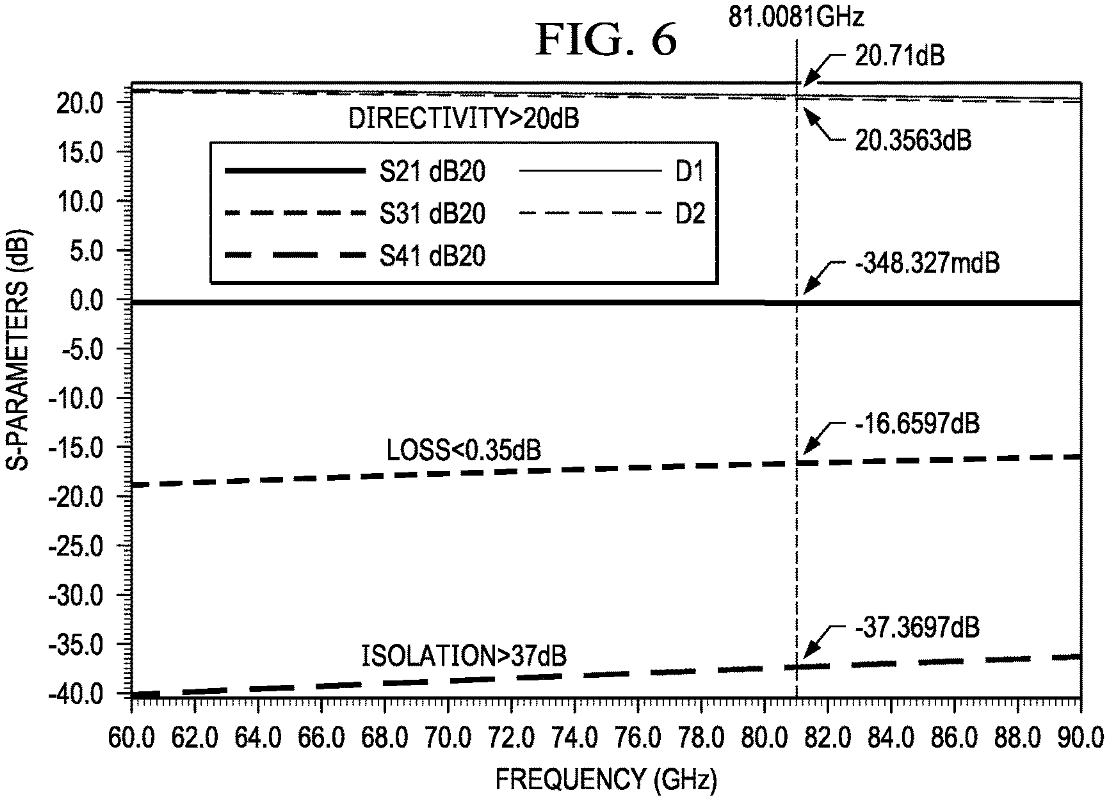
FIG. 6 is a graph showing performance of the directional coupler of FIG. 5.

FIG. 6 is a graph showing performance of the directional coupler 500. Loading the signal conductor 302 by the linear conductive trace segments 502 produces about a 5 dB improvement in directivity relative to conventional directional couplers. In FIG. 6 an implementation of the directional coupler 500 produces directivity (D1, D2) of better the 20 dB, loss (S21) of less than 0.35 dB, coupling (S31) of better than 16 dB, and isolation (S41) of better than 37 dB.

Figure 7:
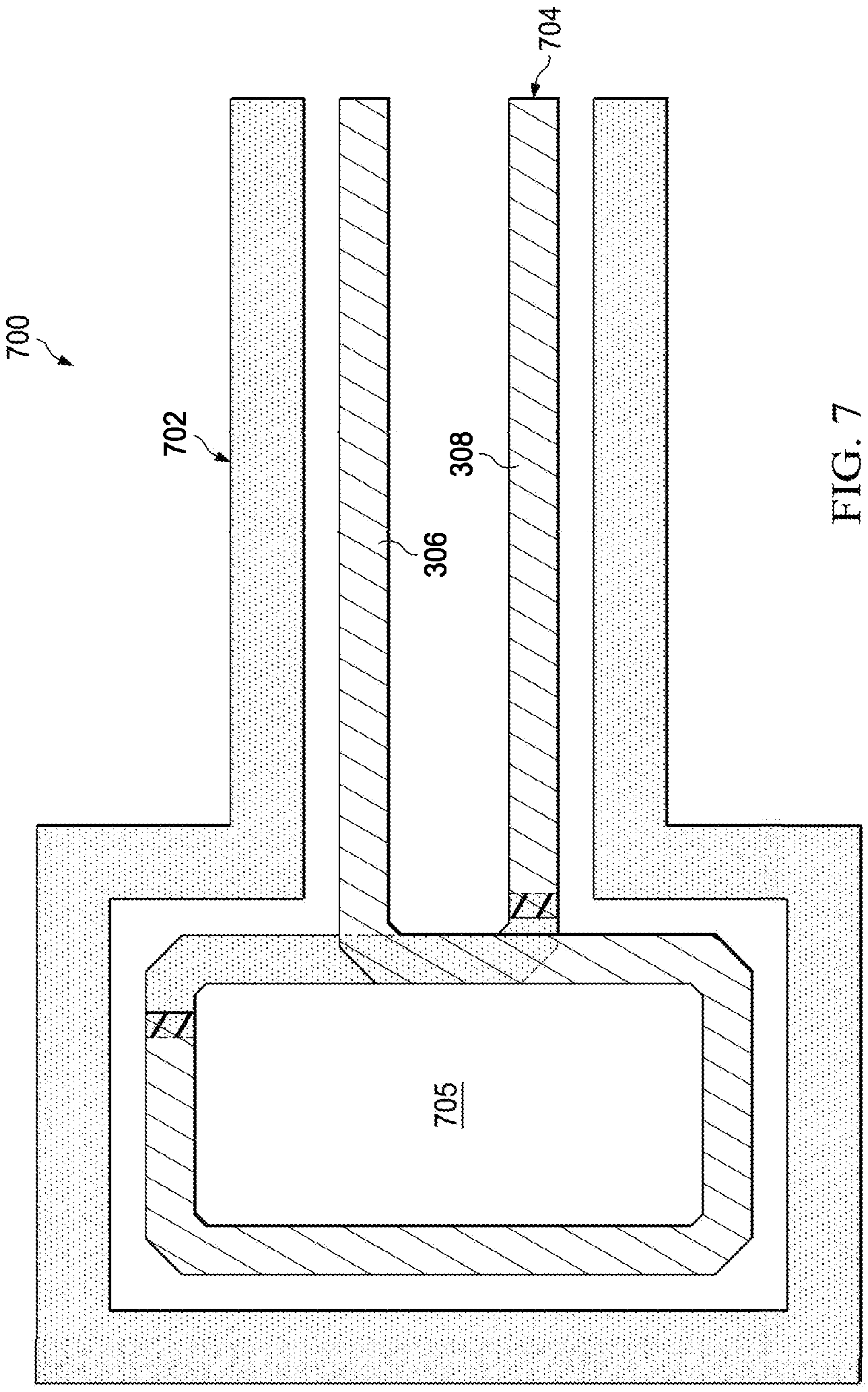
FIG. 7 is a diagram of a third directional coupler that provides independent control of magnetic and capacitive coupling.

FIG. 7 is a diagram of another directional coupler 700 that provides independent control of magnetic and capacitive coupling. The directional coupler 700 is an implementation of the directional coupler 300 or the directional coupler 500, and includes a signal conductor 702 and a coupling conductor 704. The coupling conductor 704 includes a conductive loop 705 that corresponds the conductive loop 305 of the directional coupler 300. In the directional coupler 700, the width of the conductive loop 705 has been increased (relative to the spacing of the linear conductive trace 306 and the linear conductive trace 308), with a corresponding increase in the width of the signal conductor 702 about the conductive loop 705.

The conductive loop 705 may be provided in various shapes. For example, the conductive loop 705 may be rectangular, octagonal, circular, etc. Similarly, the shape of the signal conductor 702 surrounding the conductive loop 705 may be provided in various shapes (e.g., rectangular, octagonal, circular, etc.). The shape of the signal conductor 702 surrounding the conductive loop 705 may be the same as or different from the shape of the conductive loop 705.

Figure 8:
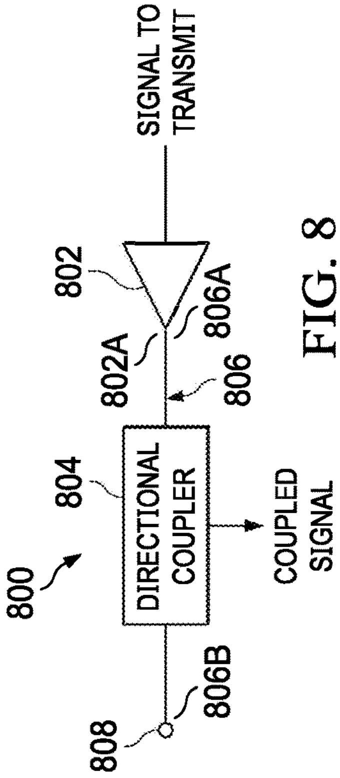
FIG. 8 is a block diagram for a circuit that includes a directional coupler that provides independent control of magnetic and capacitive coupling.

FIG. 8 is a block diagram for an integrated circuit 800 that includes a directional coupler 804 that provides independent control of magnetic and capacitive coupling. The integrated circuit 800 may be a communication system integrated circuit, a Radar sensor integrated circuit, or other integrated circuit. The directional coupler 804 may be an implementation of the directional coupler 300 or the directional coupler 500. The integrated circuit 800 includes a transmit power amplifier 802, a transmission conductor 806, and a transmit terminal 808. The transmit power amplifier 802 receives and amplifies a signal to be transmitted. The transmit power amplifier 802 includes an output 802A that is coupled to an end 806A of the transmission conductor 806. The transmission conductor 806 may effectively serve as the signal conductor of the directional coupler 804. An end 806B of the transmission conductor 806 is coupled to the transmit terminal 808. The transmit terminal 808 may be an output of the integrated circuit 800 for connecting the integrated circuit 800 to a package. The directional coupler 804 detects signal in the transmission conductor 806, and provides coupled signal to circuitry of the integrated circuit 800 for analysis and control.

In some implementations of the integrated circuit 800, the directional coupler 804 is designed to in conjunction with packaging of the integrated circuit 800 so that package capacitance is included in the design of the directional coupler. By including package capacitance in the parasitic capacitance of the directional coupler 804, transmitted signal loss may be reduced relative to designs employing a shunt stub to resonate out package capacitance.

The term "couple" is used throughout the specification. The term may cover connections, communications, or signal paths that enable a functional relationship consistent with the description of the present disclosure. For example, if device A generates a signal to control device B to perform an action, in a first example device A is coupled to device B, or in a second example device A is coupled to device B through intervening component C if intervening component C does not substantially alter the functional relationship between device A and device B such that device B is controlled by device A via the control signal generated by device A.

Modifications are possible in the described embodiments, and other embodiments are possible, within the scope of the claims.

What is claimed is:

1. A directional coupler, comprising:

a first linear conductive trace in a first metal layer, and including an end and a coupled port, and extending in a first direction from the coupled end to the end;

a second linear conductive trace, spaced apart from, alongside, and parallel to the first linear conductive trace, in the first metal layer, and including an end and an isolated port, and extending in the first direction from isolated port to the end of the second linear conductive trace;

a third conductive trace in a second metal layer, the third conductive trace extending from a first end of the third conductive trace connected to the end of the second linear conductive trace to a second end of the third conductive trace, the third conductive trace diverging from the first direction toward the first linear conductive trace, and wherein the second end of the third conductive trace is beyond the end of the first linear conductive trace in the first direction; and a fourth conductive trace in the first metal layer, the fourth conductive trace extending from a first end of the fourth conductive trace connected to the second end of the third conductive trace and diverging from the first direction toward the second linear conductive trace to pass between the first and second ends of the third conductive trace as projected onto the first layer by extending in the first direction and turning back in a direction opposite the first direction to connect to the end of the first conductive trace; and a signal trace extending alongside the first linear conductive trace, from an input adjacent the coupled port to the end of the first linear conductive trace in the first direction, around a loop formed by the third and fourth conductive traces and extending alongside the second linear conductive trace from the end of the second linear conductive trace to an output port adjacent the isolated port of the second linear conductive trace.

2. The directional coupler of claim 1, further comprising:

a first via connecting the end of the second linear conductive trace and the first end of the third conductive trace; and a second via connecting the second end of the third conductive trace and the first end of the fourth conductive trace.

3. The directional coupler of claim 1, wherein the signal trace is in the first metal layer.

4. The directional coupler of claim 1, wherein the signal trace is in the second metal layer.

5. The directional coupler of claim 1, further comprising:

a plurality of linear conductive trace segments; wherein each of the conductive trace segments is:

electrically connected to a ground;

orthogonally spanning the signal trace; and on a different metal layer than the signal trace.

6. The directional coupler of claim 1, wherein:

the third conductive trace includes a first conductive trace segment perpendicular to the first linear conductive trace and the second linear conductive trace; and the fourth conductive trace includes a second conductive trace segment perpendicular to the first linear conductive trace and the second linear conductive trace.

7. The directional coupler of claim 6, wherein:

the fourth conductive trace includes a third conductive trace segment perpendicular to the second conductive trace segment.

8. The directional coupler of claim 7, wherein the fourth conductive trace includes a fourth conductive trace segment and perpendicular to the third conductive trace segment.

9. A directional coupler, comprising:

a first linear conductive trace including an end and a coupled port;

a second linear conductive trace, spaced apart from and parallel to the first linear conductive trace, and including an end and an isolated port;

first and second vias; and a conductive loop having a first curved conductive trace and a second curved conductive trace, the conductive loop including:

a first end of the first curved conductive trace connected to the end of the second linear conductive trace through the first via;

a second end of the first curved conductive trace connected to a first end of the second curved conductive trace through the second via; and a second end of the second curved conductive trace connected to the end of the first linear conductive trace, the first curved conductive trace shorter than the second curved conductive trace.

10. The directional coupler of claim 9, wherein the first linear conductive trace and the second linear conductive trace are in a first metal layer.

11. The directional coupler of claim 10, wherein the conductive loop includes:

the first curved conductive trace in a second metal layer; and the second curved conductive trace in the first metal layer.

12. The directional coupler of claim 9, further comprising:

a signal trace around the first linear conductive trace, the second linear conductive trace, and the conductive loop, and the signal trace including an input port and an output port.

13. The directional coupler of claim 12, further comprising:

a plurality of linear conductive trace segments configured to periodically load the signal trace.

14. The directional coupler of claim 9, wherein:

magnetic coupling in the directional coupler is a function of a ratio of diameter of the conductive loop to length of the first linear conductive trace and the second linear conductive trace; and diameter of the conductive loop is measured along a centerline of the conductive loop that is parallel to the first linear conductive trace and the second linear conductive trace.

15. An integrated circuit, comprising:

a transmit power amplifier including an output;

a transmit terminal;

a directional coupler, the directional coupler including:

an input port connected to the transmit power amplifier;

an output port connected to the transmit terminal;

a first linear conductive trace in a first metal layer, the first linear conductive trace including an end and a coupled port;

a second linear conductive trace, spaced apart from and parallel to the first linear conductive trace, in the first metal layer, the second linear conductive trace including an end and an isolated port;

a conductive loop in the first metal layer and a second metal layer, the conductive loop including:

a first curved conductive trace in the second metal layer, and including:

a first end connected to the end of the second linear conductive trace; and a second end; and a second curved conductive trace in the first metal layer, and including:

a first end connected to the second end of the first curved conductive trace; and a second end connected to the end of the first linear conductive trace; and a signal trace forming a conductive path from the input port to the output port and arranged in the same direction as a conductive path in the first linear conductive trace and the second linear conductive trace from the coupled port to the isolated port, and in an opposite direction as a conductive path in the conductive loop from the end of the first linear conductive trace to the end of the second linear conductive trace.

16. The integrated circuit of claim 15, further comprising:

a plurality of linear conductive trace segments; wherein each of the linear conductive trace segments is:

orthogonally spanning the signal trace;
connected to a ground; and
on a different metal layer than the signal trace.

17. The integrated circuit of claim 15, wherein:
the first linear conductive trace is configured to provide a current path from the coupled port to the conductive loop; and
the second linear conductive trace is configured to provide a current path from the conductive loop to the isolated port.

18. The integrated circuit of claim 15, wherein:
magnetic coupling in the directional coupler is a function of a ratio of diameter of the conductive loop to length of the first linear conductive trace and the second linear conductive trace; and
diameter of the conductive loop is measured along a centerline of the conductive loop that is parallel to the first linear conductive trace and the second linear conductive trace.

19. A directional coupler comprising:
a conductive signal trace comprising a first linear portion, a turning portion, and a second linear portion and forming a current path starting at an input port of the first linear portion, extending through the first linear portion, through the turning portion, and through the second linear portion to an output port of the second linear portion; and
a conductive coupled trace formed in a space bounded on three sides by the conductive signal trace, the conductive coupled trace comprising a first linear portion, a loop portion, and a second linear portion and forming a current path starting at a coupled port at an end of the first linear portion to an isolated port at an end of the second linear portion, the conductive coupled trace including a crossing point forming the loop portion and arranged such that the current path of the conductive signal trace is in the same direction as the current path of the conductive coupled trace in first and second linear portions, and in an opposite direction as the current path of the conductive coupled trace in the loop portion.

20. The directional coupler of claim 19, wherein the conductive signal trace is formed in a first metal layer, and the conductive coupled trace is formed in two metal layers.

21. The directional coupler of claim 20, further comprising:
a plurality of linear conductive trace segments electrically connected to a ground, orthogonally spanning the conductive signal trace, and formed in a metal layer other than the first metal layer.

22. The directional coupler of claim 19, comprising:
a segment of the loop portion formed in a first metal layer;
a remainder of the loop portion formed in a second metal layer; and
conductive vias formed at each end of the segment to provide continuity throughout the conductive coupled trace.

23. The directional coupler of claim 19, the loop portion forming a rectangular loop portion.

24. The directional coupler of claim 19, wherein the first linear portion is parallel to the second linear portion.

* * * * *